A. ROSS.
GLASS DELIVERING APPARATUS.
APPLICATION FILED AUG. 19, 1915.
1,179,868.
Patented Apr. 18, 1916.
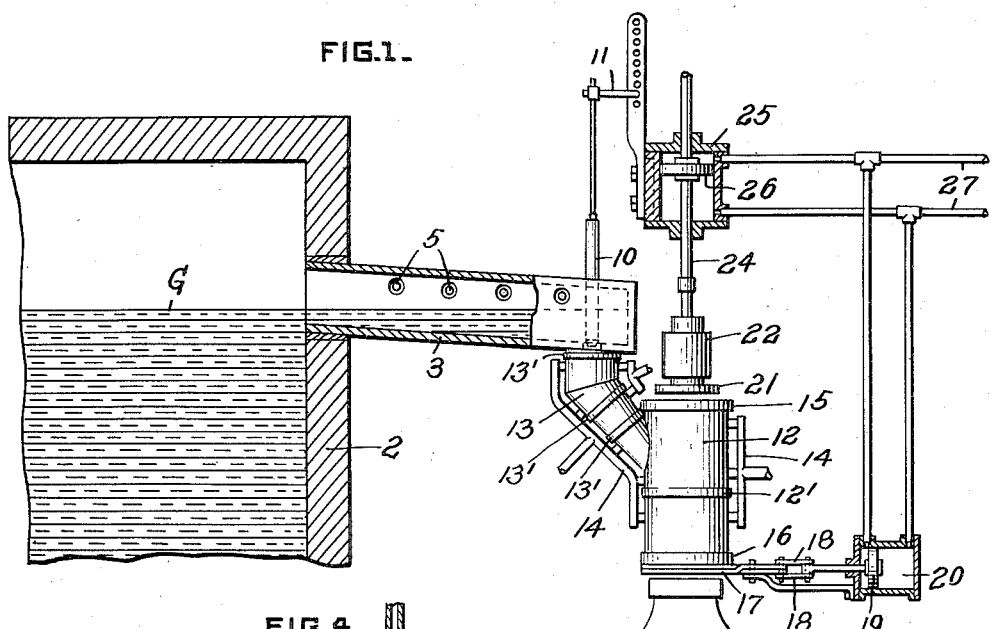
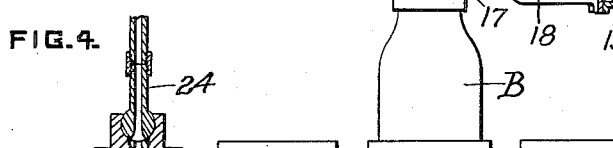
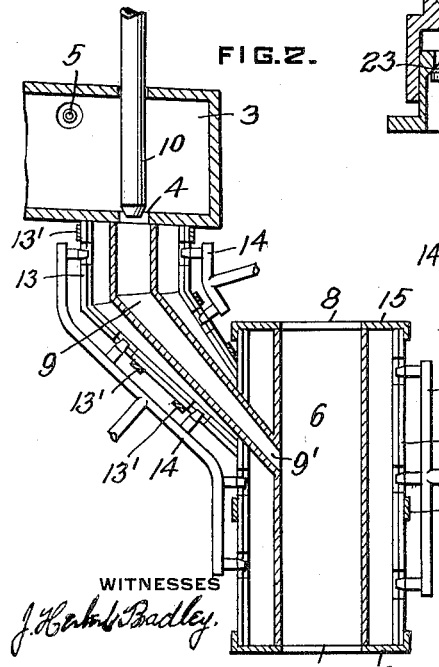
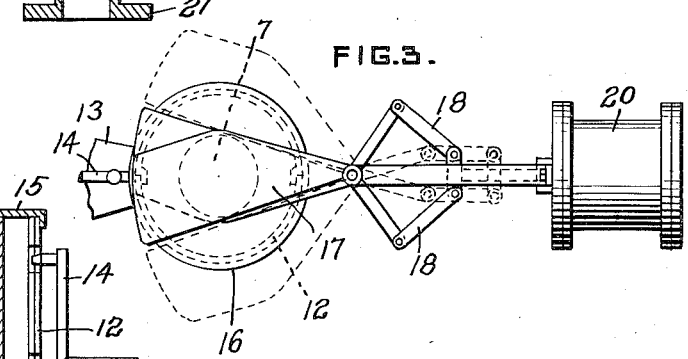
WITNESSES
INVENTOR

UNITED STATES PATENT OFFICE.

ALLEN ROSS, OF ZANESVILLE, OHIO, ASSIGNOR OF ONE-HALF TO IRVIN HARRIS, OF TOLEDO, OHIO.

GLASS-DELIVERING APPARATUS.

1,179,868.      Specification of Letters Patent.      Patented Apr. 18, 1916.

Application filed August 19, 1915. Serial No. 46,251.

*To all whom it may concern:*

Be it known that I, ALLEN ROSS, a citizen of the United States, and resident of Zanesville, in the county of Muskingum and State of Ohio, have invented certain new and useful Improvements in Glass-Delivering Apparatus, of which the following is a specification.

The object of this invention is to provide efficient means for delivering molten glass to molds, etc., and has particular reference to means for delivering the same directly from the tank or furnace whereby no handling or manual manipulation of the glass is necessary.

An important feature of the invention is the manipulation of the glass in such manner as to avoid the formation of those blemishes in finished ware that result from lapping and wiggling which ordinarily characterize the placing or flowing the glass into a mold. With the present invention these imperfections are avoided by flowing the glass into a delivering receptacle which is maintained at such temperature as to avoid the formation of lap marks, etc., with provision for discharging the glass bodily or *en masse* from the receptacle as distinguished from causing it to flow therefrom in a stream, whereby the glass thus delivered to a mold or other place for working is free from imperfections that result from the usual mold-charging flowing operation.

A further characteristic of the invention is the provision for opening the receptacle for discharging the molten glass and simultaneously admitting compressed air to its top, whereby the glass is discharged immediately upon opening the closure. The bottom closure is preferably embodied in shears which operate to sever the glass in case the flow continues into and through the receptacle during the discharging operation.

In the accompanying drawings, Figure 1 is an elevation of the apparatus, largely diagrammatic, embodying the invention. Fig. 2 is a vertical section on a larger scale of the delivering mechanism. Fig. 3 is an inverted plan of the delivering receptacle in connection with the closure-forming shears, the latter shown closed in full lines and open in dotted lines. Fig. 4 is a sectional detail of the compressed air controlling closure for the upper end of the receptacle.

Referring to the drawings, 2 designates a portion of the tank or other glass melting furnace, and 3 is a dog-house extension thereof at the normal level of the molten glass G whereby the body of molten glass is maintained in the dog house, and as the latter is preferably slightly inclined a body of glass of substantial depth is maintained in the outer portion thereof above the bottom discharge opening 4. Gas burners 5 in the crown of the dog house maintain the glass in working condition.

6 designates a delivering receptacle preferably of cylindrical form and of sufficient upward taper to readily discharge its contents, the receptacle being fully open at its lower end at 7 and similarly open at its top at 8.

The glass is conducted downwardly from discharge opening 4 through the lateral inclined spout or conduit 9 which tapers downwardly so that end 9' thereof which discharges into receptacle 6 is materially smaller than the upper portion of the conduit which receives the glass from the furnace, thereby checking the flow and minimizing the tendency to produce blemish-forming laps, etc., in the glass during its passage from the furnace to receptacle 6. The flow through opening 4 may be controlled by the plug-like stopper 10 which extends through the crown of dog house 3 with its upper end adjustably supported as indicated at 11. By this means the flow may be increased, decreased or stopped altogether as may be desired.

Receptacle 6 is inclosed by the spaced jacket 12 which may be formed in sections, secured together by band 12', and spout or conduit 9 is similarly inclosed by the spaced and sectional jacket 13, the parts of which are held together by bands 13'. Gas burners 14 are arranged to burn in the jacket-inclosed spaces, thereby maintaining the glass within the spout and the delivering receptacle at an efficient working temperature. The ring-like caps 15 and 16 for the top and bottom, respectively, of receptacle 6 close the upper and lower ends of the jacketed space, hold the jacket together, and also provide faces for coöperating with the top and bottom closure means.

The closure for the bottom of the receptacle is embodied in shears 17, the uppermost blade of which bears flatly against the face ring 16 and is of such width that when the shears are closed, as in full lines in Fig. 3, the bottom opening 7 is fully covered. When open, as in dotted lines Fig. 3, opening 7 is fully uncovered so that the entire contents of receptacle 6 may pass therethrough without interference. The shears are connected by toggles 18 with the piston 19 of cylinder 20 with provision for admitting and exhausting compressed air to and from opposite ends of the cylinder for opening and closing the shears. While the shears constitute primarily a closure for the bottom of the receptacle, they also operate to sever the glass discharging from receptacle 6 whenever from any cause it is desired to sever the glass before the receptacle has been completely emptied.

The closure for the top of receptacle 8 is similar in construction to blowing heads commonly used in connection with machines for blowing bottles, etc. As here shown, it consists of a valve-forming head 21 which is adapted to seat on top ring 15 of receptacle 6 and provide an air-tight closure for the latter. Head 21 is movable vertically in the valve body 22, coöperating therein with the valved lower end 23 of the compressed air pipe 24 which carries body 22. This pipe is extended through a cylinder 25 and within the cylinder and secured to the pipe is piston 26, whereby upon lowering the piston, head 21 is seated and at the same time the downward movement of body 22 on the head releases the air from pipe 24 into receptacle 6. The appropriate ends of cylinders 20 and 25 are so connected to the alternately acting inlet and exhaust pipes 27, that when air is admitted to the inner end of cylinder 20 for opening the shears it is simultaneously admitted to the top of cylinder 5 for closing the upper end of receptacle 6 and for admitting air thereinto. The result is that the glass is discharged bodily or *en masse* into a mold B or other receptacle located therebeneath. Generally, this discharging action will result in simply shearing the body of glass from the stream discharging from spout 9, the glass backing up in the spout until the air pressure has been discontinued. If, however, for any reason the flow continues through spout 9 during the discharging operation, or if it is desired to discharge less than the full contents of receptacle 6, appropriate valves (not shown) are operated to reverse the movements of pistons 19 and 26 whereupon the shears are closed thereby severing the glass and at the same time the flow of air into the upper end of the receptacle is discontinued and said end is opened. The slight upward taper of receptacle 6 causes the glass to readily discharge therefrom under the combined influence of gravity and the downward air pressure thereon.

It is characteristic of the invention that the glass is so discharged into the delivering receptacle and is maintained in the receptacle and during its passage thereto at such temperature as to prevent lapping and wiggling to which many blemishes in finished ware are due. The consistency of molten glass is such that upon being poured or discharged, its action is not unlike that of a thick syrup when being poured from a mug or other container, the column lapping back and forth and piling up in the mass into which it discharges. It is the action similar to this that it is the purpose of the present invention to overcome and which the improved apparatus effectually accomplishes. Any tendency of this character incident to the discharging of the glass from spout 9 into receptacle 6 is negligible and is entirely eliminated by the efficient working temperature at which the glass is maintained by means of the inclosing jackets and gas burners. And with the means herein provided for emptying the delivering receptacle, the glass is discharged therefrom bodily as distinguished from an irregular stream, and hence the glass is received in mold B or other receptacle quite free from blemish-forming imperfections.

While the invention may be variously utilized, it is designed primarily to be employed in connection with pressing and blowing machines in general use in which a series of molds are employed and which are advanced progressively through various stages in the operation of such machine, the several molds being supported by a movable carrier conventionally shown at C. And when thus employed, the apparatus constitutes automatic means for charging the molds at stated intervals with accurately predetermined quantities of glass. The delivering receptacles will vary in capacity depending on the size and weight of the articles to be produced, and it will of course be understood that the flow may be regulated by plug 10 and the operations timed by the means employed for controlling the admission of air to cylinders 20 and 25.

I claim:

1. In glass delivering apparatus, a glass furnace, an open-bottom receptacle arranged exteriorly of said furnace, a removable closure for the bottom of the receptacle, means for conducting molten glass from the furnace and into the receptacle, and means for positively expelling the glass *en masse* from the receptacle through its open bottom without closing said means for conducting molten glass from the furnace.

2. In glass delivering apparatus, an open-bottom receptacle provided with exterior heating means, a removable closure for the bottom of the receptacle, a constantly open downwardly extending conduit in communication with the receptacle and adapted to conduct molten glass thereinto, and means for positively expelling the glass *en masse* from the receptacle upon opening the closure.

3. In glass delivering apparatus, a receptacle open at its top and bottom, a removable glass severing closure for the bottom, a conduit open laterally into the receptacle below its upper end and adapted to conduct molten glass thereinto, a closure for the top of the receptacle, and means for admitting compressed air through the top closure and above the glass in the receptacle for discharging the glass *en masse* from the receptacle upon opening the bottom closure and for holding back the glass in said conduit.

4. In glass delivering apparatus, an open-bottom receptacle, swinging glass severing shear blades beneath the receptacle one of which is formed to close the open bottom thereof when the blades are closed and to afford unobstructed passage for the glass when opened, and means for discharging the contents of the receptacle *en masse* upon opening the shears.

5. In glass delivering apparatus, a receptacle open at its top and bottom, a constantly open unobstructed molten glass conduit in communication with the receptacle for supplying glass to the receptacle from an exterior source, shears beneath the receptacle and when closed comprising a closure for the lower end of the receptacle, a movable head for closing the top of the receptacle, and means for admitting compressed air through the head and into the receptacle above the outlet from the conduit into the receptacle for discharging the glass from the receptacle upon opening the shears.

6. In glass delivering apparatus, an open-bottom receptacle, a molten glass conduit in communication with the receptacle for supplying glass thereto from an exterior source, shears beneath the receptacle and when closed adapted to close the open lower end thereof, compressed air actuated means for operating the shears, means for admitting compressed air to the upper end of the receptacle above the glass therein for discharging the contents thereof, and a source of compressed air common to the shear-actuating means and to the compressed air admitting means whereby the shears are opened simultaneously with the admission of compressed air to the receptacle.

7. In glass delivering apparatus, a receptacle open at its top and bottom, a molten glass conduit in communication with the receptacle, shears beneath the receptacle and adapted when closed to form a closure for the receptacle, a removable closure for the upper end of the receptacle, a source of compressed air connected to and having its discharge into the receptacle controlled by the movement of said closure, compressed air actuated means for moving said closure, compressed air actuated means for operating the shears, and a source of compressed air common to said two actuating means whereby the top closure and shears are operated in unison.

8. In glass delivering apparatus, a glass melting furnace having a valved outlet, an open-bottom receptacle at the exterior of said furnace, a constantly open conduit at the exterior of the furnace and extending from the furnace outlet to the receptacle for supplying glass thereinto, a removable closure for the bottom of the receptacle, and means for positively driving the glass from the receptacle down through the open bottom thereof on the removal of said closure.

9. In glass delivering apparatus, a source of molten glass having a constantly open valved outlet, an open-bottom receptacle exteriorly arranged with respect to said source, a removable closure for the bottom of the receptacle, a conduit inclosing and extending downwardly from said valved outlet and discharging into said receptacle, the conduit tapering toward the receptacle, and means for expelling the glass downwardly from the receptacle upon opening the bottom closure thereof.

10. In glass delivering apparatus, a source of molten glass having a valved outlet, an exterior conduit extending downwardly from the outlet, an exterior open-bottom receptacle into which the conduit discharges, jackets inclosing and spaced from said conduit and receptacle, respectively, gas burners operative within the jacket-inclosed space, a removable closure for the bottom of the receptacle, and means for admitting fluid under pressure into the receptacle above the glass therein for discharging the glass from the receptacle upon opening said closure.

In testimony whereof I affix my signature in presence of two witnesses.

ALLEN ROSS.

Witnesses:
ROBERT W. KING,
W. F. LEWIS.